Figure 1:
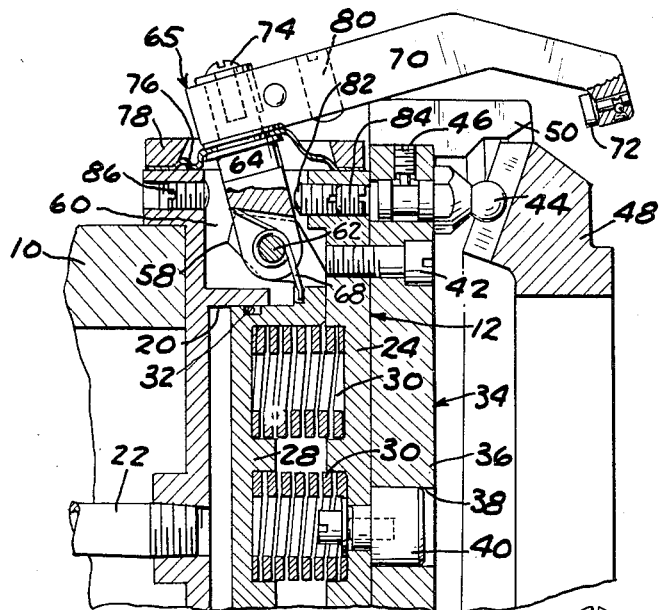

Dec. 23, 1958   J. J. PARKER ET AL   2,865,643
EDGE CLAMPING CHUCK

Filed June 27, 1957   2 Sheets-Sheet 1

INVENTORS
JOHN J. PARKER & LONDON T. MORAWSKI
BY
ATTORNEYS.

Dec. 23, 1958  J. J. PARKER ET AL  2,865,643
EDGE CLAMPING CHUCK

Filed June 27, 1957  2 Sheets-Sheet 2

INVENTORS
JOHN J. PARKER & LONDON T. MORAWSKI
BY
ATTORNEYS.

United States Patent Office 2,865,643
Patented Dec. 23, 1958

2,865,643

EDGE CLAMPING CHUCK

John J. Parker and London T. Morawski,
Detroit, Mich.

Application June 27, 1957, Serial No. 668,469

9 Claims. (Cl. 279—106)

This invention relates to chucks for holding work pieces by a clamping engagement at selected points around the edge thereof. Certain work pieces, for example bevel ring gears such as are used in automotive rear axles, are desirably chucked for certain operations by engagement of the teeth of the ring gear with a work engaging head. By thus positioning the gear, for example against a number of raised buttons or projections of known dimensions, it is possible to accurately finish the mounting face of the gear with sufficient precision that cut-and-try shimming of the gear upon its mounting may be eliminated or at least minimized, while still affording quiet operation of the gears in use.

It is an object of the present invention to provide an improved chuck wherein a work piece of annular or disk shape may be accurately positioned by an axial clamping action exerted at a plurality of points around the periphery of the piece.

A further object is to provide a chuck of this character in which the clamping action is produced by pivoted talons which partake of both pivoting and translatory motion so that the talons may be quickly moved radially into and out of position overlying the edge of the work piece, and, in addition, partake of a translatory motion in an axial direction by which the work piece is clamped.

Figure 2:
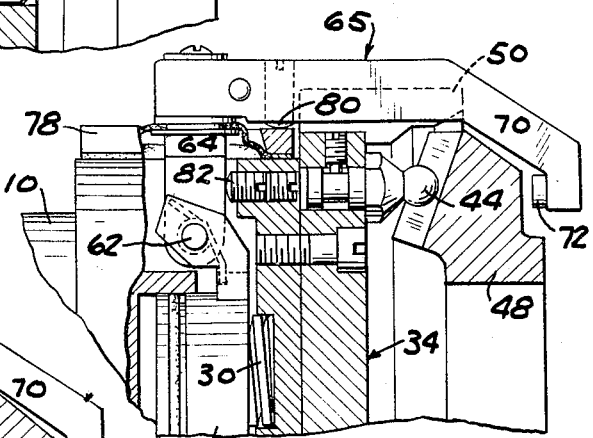
Figure 3:
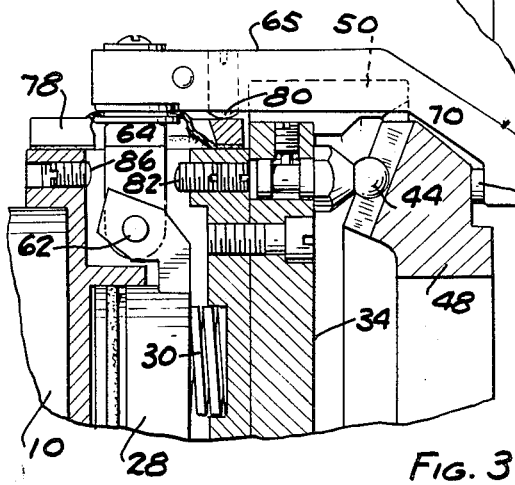
Figure 4:
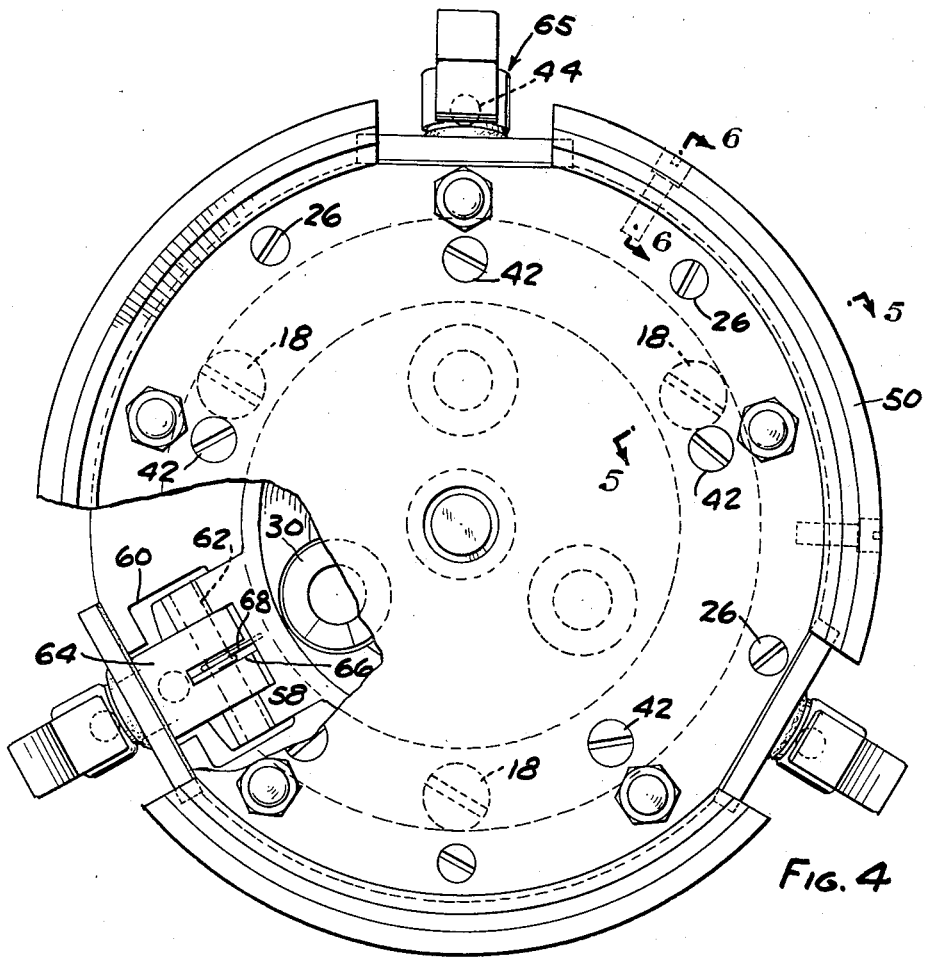
Figure 5:
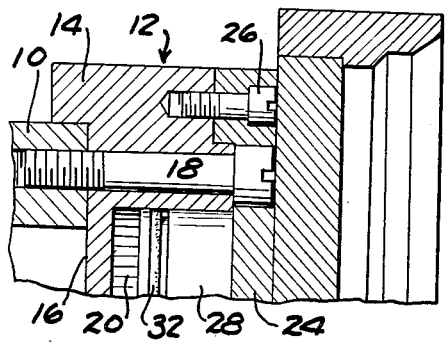
Figure 6:
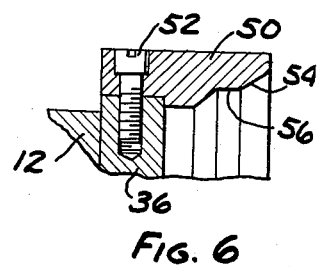

These and other objects are accomplished by the provision of a chuck having a main body carrying a work engaging head on its front face. Within the body there is provided a piston or other reciprocating actuator which carries near its periphery a plurality of pivots upon which clamping talons are mounted. Means are provided for causing pivoting motion of the talons during one part of the motion of the actuator and merely axial translation for clamping and unclamping during the other part of the actuator motion. A preferred embodiment of the invention is illustrated in the drawings in which:

Fig. 1 is a fragmentary axial section of a chuck showing the parts in the released position, Fig. 2 is a view corresponding to Fig. 1 showing the parts in a partially engaged position, Fig. 3 is a view corresponding to Fig. 1 showing the parts in fully engaged position, Fig. 4 is a front view of the chuck partly broken away, Fig. 5 is a fragmentary cross section on line 5—5 of Fig. 4, and Fig. 6 is a fragmentary cross section on line 6—6 of Fig. 4.

The chuck illustrated is adapted to be mounted upon a suitable support such as a spindle 10 of a machine tool. The chuck comprises a main body 12, which is formed of two parts. As will be seen from Fig. 5, the rear part is formed as a cylinder 14 having a rear face 16 which is secured to the spindle 10 by bolts 18. The part 14 is provided with a central cylindrical chamber 20 having a fluid connection pipe 22. The front part of the body 12 comprises a cover 24 secured to the part 14 by bolts 26. Within the cylinder 20, there is mounted for reciprocating a piston 28 which is biased to the left in Fig. 1 by heavy springs 30. A suitable O-ring or other sliding seal is provided at 32. The piston 28 forms an actuator to open and close the chuck.

Secured to the front face of the body 12 is a work engaging head generally designated 34. This comprises a plate 36 having a central bore 38 which is received upon a pilot pin 40 secured to the front plate 24 of the body 12. The plate 36 is secured on the body 12 by bolts 42. The head 34 carries a number of projecting work supports 44 which take the form of studs having spherical heads. These ball-studs are secured to the plate 36 by set screws 46. They are accurately dimensioned as to the diameter of the ball and the height of the ball center in front of the plate 36 so that when a work piece such as a bevel ring gear 48 is mounted with the projections 44 lying between the teeth of the gear, an accurate dimensional relationship with the theoretical pitch cone of the gear may be established. The plate 36 also carries a plurality of work guiding flanges 50 which are secured to the outer edge thereof by screws 52 as shown in Fig. 6. The guides 50 are formed as annular segments having a conical guiding entry surface 54 and a cylindrical work centering surface 56.

The chuck actuator which comprises the piston 28 has a plurality of radially extending ears 58 which extend beyond the cylinder 20. For this purpose, the outer wall of the part 14 is recessed at selected parts of its periphery to form talon receiving pockets 60. The ears 58 are bifurcated as shown in Fig. 4 and carry pivot pins 62 upon each of which there is pivoted a stud 64 forming part of a talon 65.

The central slot 66 in the stud 64 receives a torsion spring 68 which is arranged to bias the stud 64 in a clockwise direction in Fig. 1 about the pivot pin 62. Removably secured to the outer end of the studs 64 are a plurality of talon fingers 70 having work engaging tips 72. The fingers 70 are secured to the studs 64 by any suitable clamping arrangement such as the screws 74. The open end of each talon receiving pocket 60 is closed by a flexible diaphragm 76 of leather or other flexible material which is secured at its mid portion to the stud 64 and at its periphery is clamped to the body 12 by a circular clamp ring 78 which is held down by screws, not shown. An adjustable stop screw 80 is provided on each finger 70 for engagement with the top of the ring 78 during a clamping operation.

For the purpose of causing motion of each talon tip 72 in a radial direction, the cover plate 24 carries an adjustable stop screw 82 having a locking screw 84 behind it. The stop screw 82 is located radially outward of each pivot point 62 and in a position to abut the talon stud 64 in the position of the parts illustrated in Fig. 1. If desired, a motion limiting stop screw 86 may be provided in the body part 14 for engaging the opposite side of the talon stud 64 to limit the final clamping action.

In operation, starting with the parts in the position shown in Fig. 1, the piston 28 has been pressed to the right by the admission of pressure fluid, such as hydraulic oil or compressed air from a suitable source, through the pipe 22. This compresses the springs 30 and holds the talons 65 in their radially outer position because of the engagement of the talon studs 64 with the stop screws 82 which rocked the talons counterclockwise about the pivots 62. A work piece such as the ring gear 48 may then be located on the ball-studs 44 ready to be clamped against the same. The guide pieces 50 serve to hold the work piece in a central position by engagement with the outer periphery thereof.

When the fluid pressure is relieved through the connection 22, the clamping action is produced by the extension of springs 30. During the first phase of the clamping action, the piston 28 moves to the left and the talons 65 partake of a clock-wise rocking motion about their pivots 62. This results in shifting of the talon tips 72 radially inward to a position overlying the work piece as shown in Fig. 2. Thereafter, the further leftward movement of piston 28 translates the talons 65 bodily to the left and produces a clamping pressure between the tips 72 and the ball-studs 44.

It will be seen that this pressure is exerted in an axial direction near the edge of the work piece. This serves to position the work piece from the surfaces of the actual gear teeth 86 and enables a finishing operation to be performed upon the mounting face of the gear so as to produce a finished dimension having an accurately established value with respect to the gear teeth themselves.

By the provision of talons made of two pieces, it is possible to remove the fingers 70 and substitute other fingers of different dimension for co-operation with work pieces of different size and shape. Likewise, the work engaging head 34 may be readily removed and replaced with a different head proportioned to fit other work pieces.

It will be noted that the motion of the actuating member or piston 28 while primarily in an axial direction is also such as to allow slight rocking or tilting of its axis with respect to the axis of the chuck body. The piston being very short in comparison with its diameter, the normal piston and cylinder clearance allows for a certain amount of this movement, and thus insures a tight clamping of all three talons against the work piece 48 irrespective of irregularities in the surface with which the talons are in contact.

It will thus be seen that the present invention provides a work holding chuck which by a single motion of a chuck actuator produces both radial and axial motions of the work engaging talons. It will further be seen that the work piece is gripped by a clamping force adjacent the edge which is exerted in an axial direction.

While the form of embodiment of the invention as herein disclosed constitutes a preferred form, it is to be understood that other forms might be adopted, all coming within the scope of the claims which follow.

What is claimed is as follows:

1. A chuck for holding a work piece of circular form by axially directed clamping forces exerted at a plurality of points adjacent its periphery comprising a body member having a rear face forming a support for attaching the chuck to a machine spindle and a front face for receiving a work engaging head, a chuck actuating member mounted in the body for axial motion between the faces, means forming a plurality of pivots rigidly carried by the actuating member with their axes tangentially positioned and equally spaced around the periphery of the body, a plurality of generally C-shaped clamping talons each mounted on a pivot and extending forwardly and inwardly to a work engaging tip, means acting between said actuating member and said talons and yieldably biasing the talons on said pivots toward the innermost position of their tips, and means effective during only a portion of the stroke of the actuating member for moving the talons outwardly against their bias whereby the actuator upon a rearward movement will first cause rocking of the talons inwardly and thereafter will move the talons bodily toward the rear to clamp a work piece between the tips and the work engaging head.

2. An edge clamping chuck for a circular work piece comprising a body, a stationary work engaging head on the front of the body, a plurality of clamping talons having work engaging tips movable radially to clear the edge of a work piece and axially rearwardly to clamp the work against the head, a chuck actuating member shiftable axially in the body and having a plurality of tangentially arranged pivots each carrying a talon, spring means acting between said actuating member and said talons and biasing the talons such that the tips tend to assume a radially innermost position, and stationary means engaging the talons during a terminal portion of the travel of the actuating member in a forward direction to cause rocking of the talons radially outwardly about their pivots whereby during the clamping or rearward stroke of the actuator the talons are first rocked inwardly about their pivots by said spring means to move the talon tips radially inwardly into a position in front of the work piece and thereafter, while under the bias of said spring means, the talons are carried bodily to the rear to clamp the work piece against the head.

3. A chuck as called for in claim 1 wherein said biasing means comprise torsion springs on said pivots.

4. A chuck as called for in claim 1 wherein said last mentioned means comprise abutments fixedly mounted on the chuck and positioned in the path of travel of said talons, said abutments being adapted to engage said talons and pivot them outwardly against their bias when the actuator member is moved forwardly.

5. A chuck as called for in claim 1 wherein said last mentioned means comprise a plurality of abutments, one for each talon, adjustably mounted on said chuck in the path of travel of the talons, said talons each having a radially extending portion with an axially extending clamping portion at their outer ends, said abutments being positioned to engage said radial portions of the talons at a point radially inwardly of the axially extending clamping portions.

6. A chuck as called for in claim 2 including means for adjustably limiting the extent of radial movement of the talons in an inwardly direction under the bias of said spring means.

7. A chuck as called for in claim 2 wherein said actuator comprises a fluid operated piston, said body having an axially extending cylinder therein in which the actuator is slidably arranged and means on said body for applying fluid pressure to one side of the piston.

8. A chuck as called for in claim 7 including means normally biasing the piston rearwardly in a clamping direction, said means for applying fluid pressure to the piston being arranged to move the piston forwardly against said last mentioned biasing means in the releasing direction.

9. A chuck as called for in claim 8 wherein said piston biasing means comprises spring members.

References Cited in the file of this patent

UNITED STATES PATENTS

| | | |
|---|---|---|
| 2,443,895 | Day et al. | June 22, 1948 |
| 2,473,380 | Ljunggren et al. | June 14, 1949 |